United States Patent
Del Vigna, Jr. et al.

(10) Patent No.: US 7,549,085 B2
(45) Date of Patent: Jun. 16, 2009

(54) METHOD AND APPARATUS TO INSERT SPECIAL INSTRUCTION

(75) Inventors: Paul Del Vigna, Jr., Cupertino, CA (US); Shasank K Chavan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 11/413,898

(22) Filed: Apr. 28, 2006

(65) Prior Publication Data
US 2007/0294576 A1    Dec. 20, 2007

(51) Int. Cl.
*G06F 11/00*    (2006.01)

(52) U.S. Cl. .......................... 714/35; 714/36; 717/129; 712/228

(58) Field of Classification Search ............... 714/12, 714/35, 34
See application file for complete search history.

(56) References Cited

U.S. PATENT DOCUMENTS

| | | | | |
|---|---|---|---|---|
| 5,226,152 A * | 7/1993 | Klug et al. | ..................... | 714/12 |
| 5,233,615 A * | 8/1993 | Goetz | ......................... | 714/12 |
| 5,384,906 A * | 1/1995 | Horst | ........................ | 713/375 |
| 5,956,758 A * | 9/1999 | Henzinger et al. | .......... | 711/213 |
| 6,038,685 A * | 3/2000 | Bissett et al. | ................ | 714/12 |
| 6,256,777 B1 * | 7/2001 | Ackerman | ................... | 717/129 |
| 6,615,366 B1 * | 9/2003 | Grochowski et al. | .......... | 714/10 |
| 7,016,807 B2 * | 3/2006 | Morimoto et al. | ........... | 702/183 |
| 2003/0101436 A1 * | 5/2003 | Kobrosly et al. | ............ | 717/128 |
| 2003/0182510 A1 * | 9/2003 | Mitra et al. | ................. | 711/122 |
| 2004/0015864 A1 * | 1/2004 | Boucher | ..................... | 717/124 |
| 2004/0117771 A1 * | 6/2004 | Venkatapathy | .............. | 717/130 |
| 2004/0187132 A1 * | 9/2004 | Kottapalli et al. | ........... | 718/100 |
| 2004/0268091 A1 * | 12/2004 | Pessolano | ................... | 712/215 |
| 2005/0010897 A1 | 1/2005 | Ogawa et al. | | |
| 2005/0027973 A1 * | 2/2005 | Barry et al. | ................. | 712/233 |
| 2005/0138294 A1 | 6/2005 | Serrano et al. | | |
| 2007/0083645 A1 * | 4/2007 | Roeck et al. | ................ | 709/224 |
| 2007/0168736 A1 * | 7/2007 | Ottavi et al. | .................. | 714/34 |

OTHER PUBLICATIONS

Marco Fillo et al., "The M-Machine Multicomputer," Appears in the Proceedings of MICRO-28, 1995, 11 pp.

* cited by examiner

*Primary Examiner*—Scott T Baderman
*Assistant Examiner*—Kamini Patel

(57) ABSTRACT

A method and apparatus to insert special instruction. At least one of the illustrative embodiments is a method comprising converting a first representation of a computer program to a second representation, and inserting into the second representation a special instruction not needed to implement functionality in the first representation. The special instruction gives duplicate copies of the computer program executed in different processors an opportunity to service external asynchronous interrupts.

28 Claims, 5 Drawing Sheets

METHOD AND APPARATUS TO INSERT SPECIAL INSTRUCTION

BACKGROUND

Fault tolerance may be implemented on some computer systems by executing the same software application in lock-step as between two processors. In some cases the lock-step operation may be cycle-by-cycle or strict lock-step. However, because of non-deterministic behavior of processors (e.g., branch prediction, speculative fetching, and out or order processing), operation may be lock-step, but not strict lock-step. In such systems the processors execute duplicate copies of the same code, but not necessarily in a cycle-by-cycle fashion or at the same wall clock time. Lock-step operation that is not cycle-by-cycle or at the same wall clock time may be referred to as "loose lock-step."

In loose lock-step systems, difficulties arise in ensuring that execution points within the duplicate copies of the software application do not get too far removed from one another. Relatedly, handling of interrupts generated external to the processors becomes problematic.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
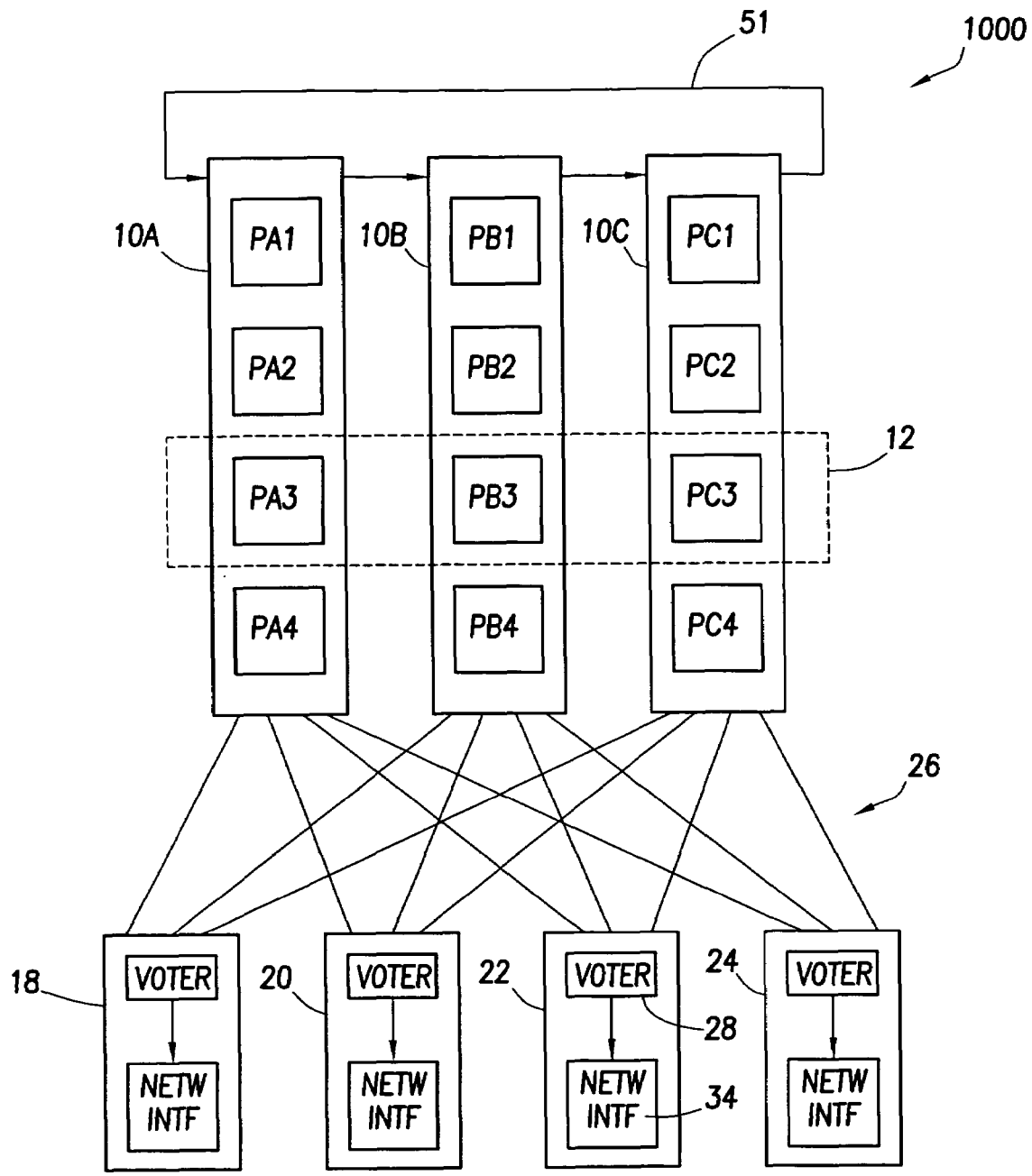
FIG. 1 illustrates a computing system in accordance with embodiments of the invention.

FIG. 1 illustrates a computing system 1000 in accordance with embodiments of the invention. In particular, the computing system 1000 may comprise a plurality of multiprocessor computer systems 10. In some embodiments, only two multiprocessor computer systems 10 may be used, and as such the computing system 1000 may implement a dual-modular redundant (DMR) system. As illustrated in FIG. 1, the computing system 1000 comprises three multiprocessor computer systems 10, and therefore implements a tri-modular redundant (TMR) system. Regardless of whether the computer system is dual-modular redundant or tri-modular redundant, the computing system 1000 implements fault tolerance, at least in part, by redundantly executing programs across the multiprocessor computer systems.

In accordance with embodiments of the invention, each multiprocessor computer system 10 preferably comprises one or more processors, and as illustrated in FIG. 1 four processors. Each processor of FIG. 1 has a leading "P," indicating a processor. Further, each processor is given a letter designation of "A," "B," or "C," to indicate the processor's physical location within one of the multiprocessor computer systems 10A, 10B and 10C respectively. Finally, each processor is given a numerical designation to indicate that processor's location within each multiprocessor computer system. Thus, for example, the processors in multiprocessor computer system 10A have designations "PA1," "PA2," "PA3," and "PA4."

In accordance with embodiments of the invention, at least one processor from each multiprocessor computer system 10 may be logically grouped to form a logical processor 12. In the illustrative embodiments of in FIG. 1, processors PA3, PB3, and PC3 are grouped to form the logical processor 12. In accordance with embodiments of the invention, each processor within a logical processor substantially simultaneously executes duplicate copies of a user program. More particularly, each processor within a logical processor is provided the same instruction stream for the user programs and computes the same results (assuming no errors), but the processors within the logical processor are not in cycle-by-cycle or strict lock-step; rather, the processors are loosely lock-stepped, with synchronization and handling of interrupts occurring based on rendezvous points (discussed below). In the event one of the processors fails, the one or more remaining processors may continue without affecting overall system performance.

Inasmuch as there may be two or more processors within a logical processor executing the same user program, duplicate reads and writes may be generated, such as reads and writes to network interface 34. In order to compare the reads and writes for purposes of fault detection, each logical processor has associated therewith a synchronization logic. For example, processors PA1, PB1 and PC1 may form a logical processor associated with synchronization logic 18. Likewise, the processors PA2, PB2 and PC2 may form a logical processor associated with synchronization logic 20. The logical processor 12 may be associated with synchronization logic 22. Finally, processors PA4, PB4 and PC4 may form a logical processor associated with synchronization logic 24. Thus, each multiprocessor computer system 10 may couple one each to each of the synchronization logics 18, 20, 22 and 24 by way of an interconnect 26. The interconnect 26 may be a Peripheral Component Interconnected (PCI) bus, and in particular a serialized PCI bus, although other bus and/or network communication schemes may be equivalently used.

Each synchronization logic 18, 20, 22 and 24 comprises a voter logic unit, e.g., voter logic 28 of synchronization logic 22. The following discussion, while directed to voter logic 28 of synchronization logic 22, is equally applicable to each voter logic unit in each of the synchronization logics 18, 20, 22 and 24. The voter logic 28 acts to consolidate read and write requests from the processors, and plays a role in the exchange of information between processors. Consider for purposes of explanation each processor in logical processor 12 executing its copy of a user program, and that each processor generates a read request to network interface 34. Each processor of logical processor 12 sends its read request to the voter logic 28. The voter logic 28 receives each read request, compares the read requests, and (assuming the read requests agree) issues a single read request to the network interface 34.

In response to the single read request issued by a synchronization logic, the illustrative network interface 34 returns the requested information to the voter logic 28. In turn, the voter logic replicates and passes the requested information to each of the processors of the logical processor. Likewise, for other input/output functions, such as writes and transfer of packet messages to other programs (possibly executing on other logical processors), the synchronization logic ensures that the requests match, and then forwards a single request to the appropriate location. In the event that any one processor in a logical processor does not function properly (e.g., fails to generate a request, fails to generate a request within a specified time, generates a non-matching request, or fails completely), the user program may continue based on requests of the remaining processor or processors of the logical processor.

Figure 2:
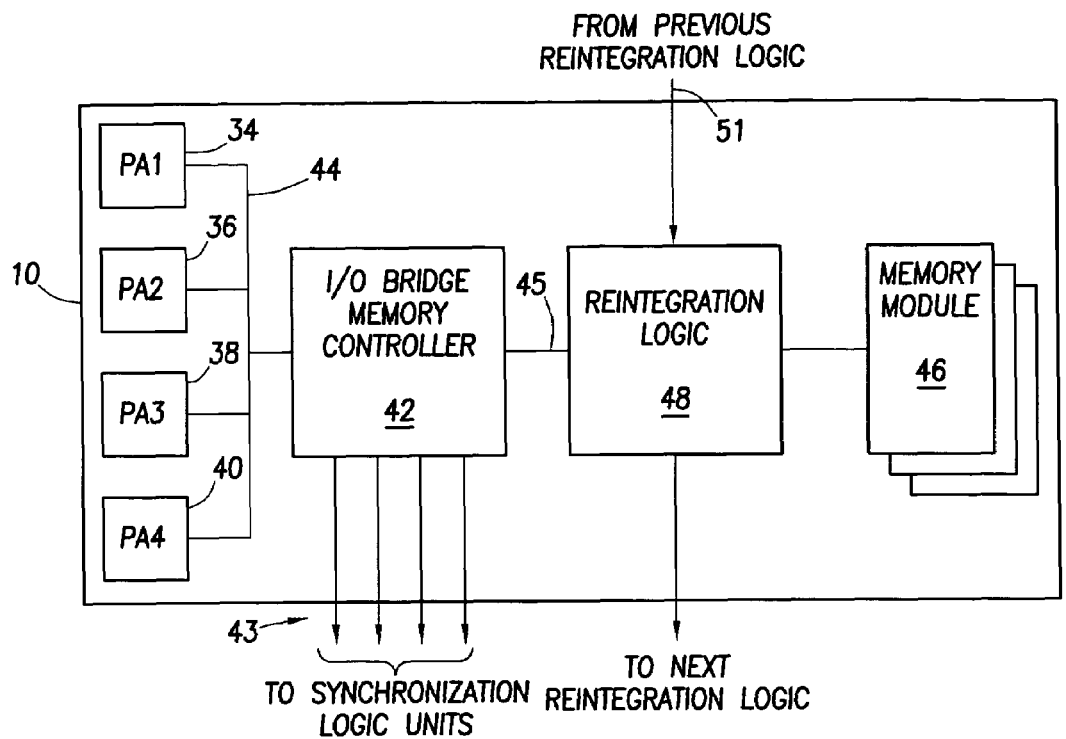
FIG. 2 illustrates in greater detail a computing system in accordance with embodiments of the invention.

FIG. 2 illustrates in greater detail a multiprocessor computer system 10. In particular, FIG. 2 illustrates that a multiprocessor computer system 10 in accordance with embodiments of the invention may have a plurality of processors, in the illustrative case of FIG. 2 four such processors 34, 36, 38 and 40. While only four processors are shown, any number of processors may be used without departing from the scope and spirit of the invention. The processors 34-40 may be individually packaged processors, processor packages comprising two or more processor dies within a single package, or multiple processors on a single die. Each of the processors may couple to an I/O bridge and memory controller 42 (hereinafter I/O bridge 42) by way of a processor bus 44. The I/O bridge 42 couples the processors 34-40 to one or more memory modules 46 by way of a memory bus 45. Thus, the I/O bridge 42 controls reads and writes to the memory area defined by the one or more memory modules 46. The I/O bridge 42 also allows each of the processors 34-40 to couple to synchronization logics (not shown in FIG. 2), as illustrated by bus lines 43.

Still referring to FIG. 2, the memory defined by the one or more memory modules 46 may be partitioned, one partition for each processor, therefore allowing each of the processors to operate independently. In alternative embodiments, each processor may have its own integrated memory controller, and thus each processor may have its own dedicated memory, and this too would be within the contemplation of the invention. The computing system 1000, of which the multiprocessor computer system 10 may form a part, implements loosely lock-stepped execution of user programs among processors within a logical processor. Loosely lock-stepped may mean that that each processor of a logical processor (e.g., logical processor 12) may execute a duplicate copy of a user program, but the instructions need neither be executed in a strict lock-step fashion, nor executed at the same wall clock time. Thus, the processors 34-40 may be of various architectures, including (but not limited to) non-deterministic processors which may not be suitable for strict lock-step execution or on counting retired instructions. Intel's® Itanium® processor family (IPF) is one example of a family of processors that performs non-deterministic execution and therefore is not suitable for strict lock-step execution or on counting retired instructions.

FIG. 2 further shows that each multiprocessor computer system 10 comprises a reintegration logic 48 coupled between the I/O bridge 42 and the memory modules 46. The illustrative embodiments of FIG. 1 show the interconnections of the reintegration logics (line 51) in the form of a ring, but any network topology may be equivalently used (e.g., ring, tree, dual rings, fully connected). In operation, the reintegration logic 48 is transparent to the I/O bridge 42, and does not interfere with reads and writes to the one or more memory modules 46. However, in the event that one processor within a logical processor experiences a fault and needs to be restarted, the reintegration logic 48 plays a role in copying memory to the faulted multiprocessor computer system so the multiprocessor computer system can be restarted.

In a loosely lock-stepped system, the reasons a processor may lead or lag may be many. For example, while each processor may execute instructions at substantially the same clock frequency, even minor differences in actual clock frequency may result in substantial differences over time (timing non-determinism). Moreover, processors implemented in accordance with at least some embodiments of the invention have non-deterministic execution, and thus even provided precisely the same user program the processors may diverge greatly in the number of executing steps to arrive at a common point in the user program. Further still, some processors could encounter data access delays and/or fixable errors (non-architecturally visible state non-determinism). Some examples may be: one processor may experience a cache miss that other processors may not experience; one processor may experience a correctable memory error, thus requiring execution of a recovery routine not needed by the remaining processors; and one processor may experience a miss of the translation look-aside buffer, causing additional processing but not affecting final outcome of the user program. Again, while the processors eventually arrive at the same execution point in the user program, the number of instructions executed and the time required to execute those instructions may not be the same.

With the idea in mind that processors of a logical processor may be executing the same instruction stream, but may not be at the same point in the instruction stream, the discussion turns to handling of interrupts in such an environment. Even if the same interrupt is asserted to each processor at precisely the same wall clock time, by virtue of the loosely lock-stepped execution of their respective processors the interrupts may not be asserted at the same execution point of the user program. The difficulty is further exacerbated by the fact that interrupt assertion itself is asynchronous. In order to ensure proper operation, each processor within a logical processor needs to service interrupts at the same execution point in the instruction stream of the user program. Ensuring interrupts are serviced at the same execution point in the instruction stream is accomplished in accordance with embodiments of the invention by utilizing the synchronization logic as a mechanism to agree on a rendezvous point at which to service the interrupt.

Figure 3:
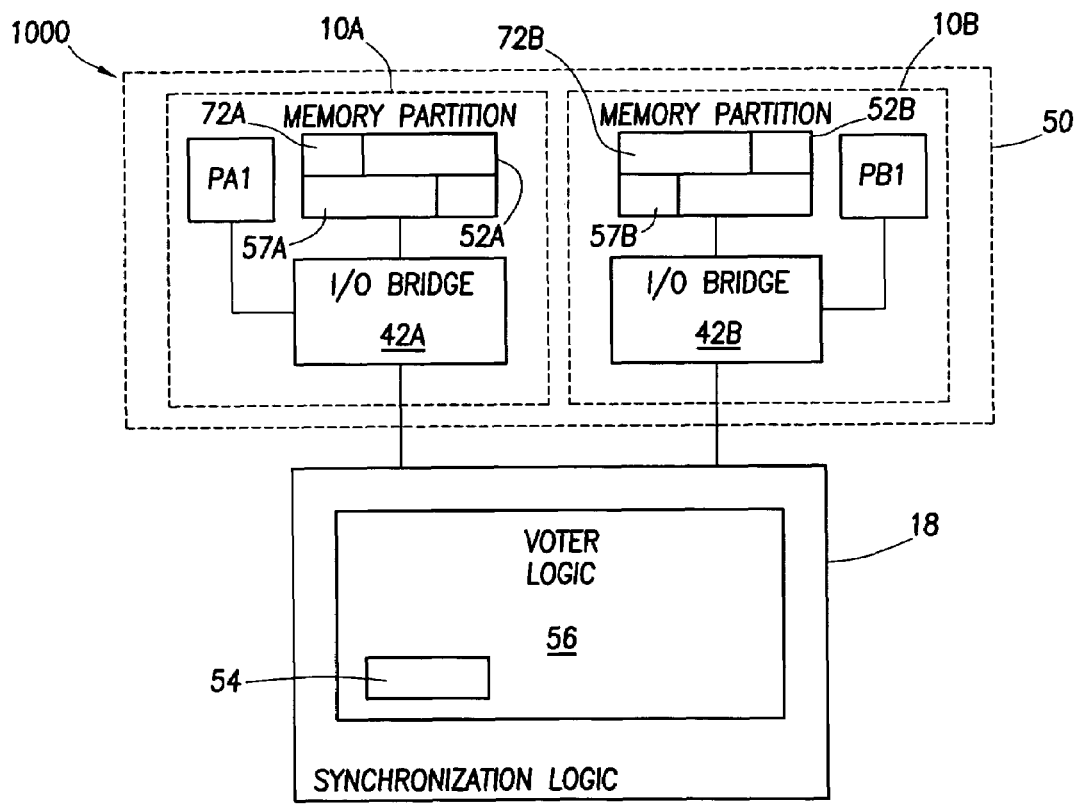
FIG. 3 illustrates a partial computing system in accordance with embodiments of the invention.

In accordance with embodiments of the invention, processors within a logical processor communicate with each other that: particular interrupts have been asserted; and a proposed point in the user program at which to suspend execution and to service the interrupt. Stated otherwise, processors in a logical processor agree on which interrupt to be serviced (or to be serviced first) and also agree on a point in the user program at which to service the interrupt. FIG. 3 illustrates a partial computing system 1000 in order to describe the operation of the various components that work together to coordinate servicing of interrupts. FIG. 3 is a simplified version of the system of FIG. 1 in the sense that the logical processor 50 in this case comprises only two processors PA1 and PB1. FIG. 3 is also, in another sense, more detailed than FIG. 1 inasmuch as FIG. 3 illustrates the memory partition 52 for each processor, and how the processor couples to the memory partition and the voter logic through the I/O bridge 42. Thus, the logical processor 50 of FIG. 3 comprises one processor each from the multiprocessor computer systems 10A and 10B. Processor PA1 couples to I/O bridge 42A, which in turn couples both to the synchronization logic 18 and PA1 processor's memory partition 52A. Processor PB1 couples to its respective I/O bridge 42B, which in turn couples to the synchronization logic 18 and PB1 processor's memory partition 52B.

In accordance with at least some embodiments, having the processors of a logical processor exchange information for purposes of establishing a rendezvous point involves each processor writing information to synchronization registers 54 in the voter logic 56 of the synchronization logic 18. A rendezvous point, in accordance with embodiments of the invention, may be any suitable location, such as: each time a dispatcher function of the operating system executes and sets other tasks to execution; traps and fault handlers; and system calls made by user programs. User programs may at certain points in their execution make system calls, where a system call is any call to a privileged program (executed in a higher privileged mode than a user mode), such as operating system programs. The term "system call" is used in this specification, and in the claims, to refer to any potential rendezvous point. A system call number may be a number which indicates how many system calls have been made from an arbitrary staring point. Location 72 of FIG. 3 illustrates a location in a memory partition 52 at which a system call number may reside. In alternative embodiments, the system call number may be equivalently stored in a register located other than in memory partition 52. In the embodiments illustrated in FIG. 3, the synchronization registers 54 are pre-designated memory locations, but any location where data may be equivalently used. After some or all of the processors have written their respective information, voter logic 56 writes the information in the synchronization registers 54 back to corresponding set of registers 57 in each of the memory partitions 52. Writing the information to the synchronization logic allows the processing of the user program to continue while waiting for the remaining processors to see the interrupt. In alternative embodiments, each processor may make a waited read to the memory locations in the synchronization registers 54, waiting meaning that the read will not complete until each processor writes the corresponding information regarding the interrupt. While the waited read as a byproduct may act to synchronize the processors, each processor waits in a software loop for the read to complete, and thus waited reads as a mechanism to exchange information regarding interrupts does not allow the user program to continue execution. Regardless of how the data exchange is performed, by exchanging information the processors within a logical processor coordinate at what point in the user program to service an interrupt.

Interrupts may be asserted to a processor at any time by way of packet-based messages containing interrupt information, or by way of dedicated interrupt signal lines. Interrupts may also be asserted to a processor from an internal source, such as a timer that is set to expire after some number of processor clock cycles. When such a packet, signal line or internal interrupt is received and detected by the processor, the user program is suspended and an interrupt handler routine is invoked. The purpose of the interrupt handler routine is to begin the process of identifying the rendezvous point. No action is taken with respect to the services requested by the interrupt by the interrupt handler routine. Rendezvous points (e.g., system calls) are the points at which the process of scheduling the rendezvous point is completed, and also scheduling programs to service the interrupts received.

Figure 4A:
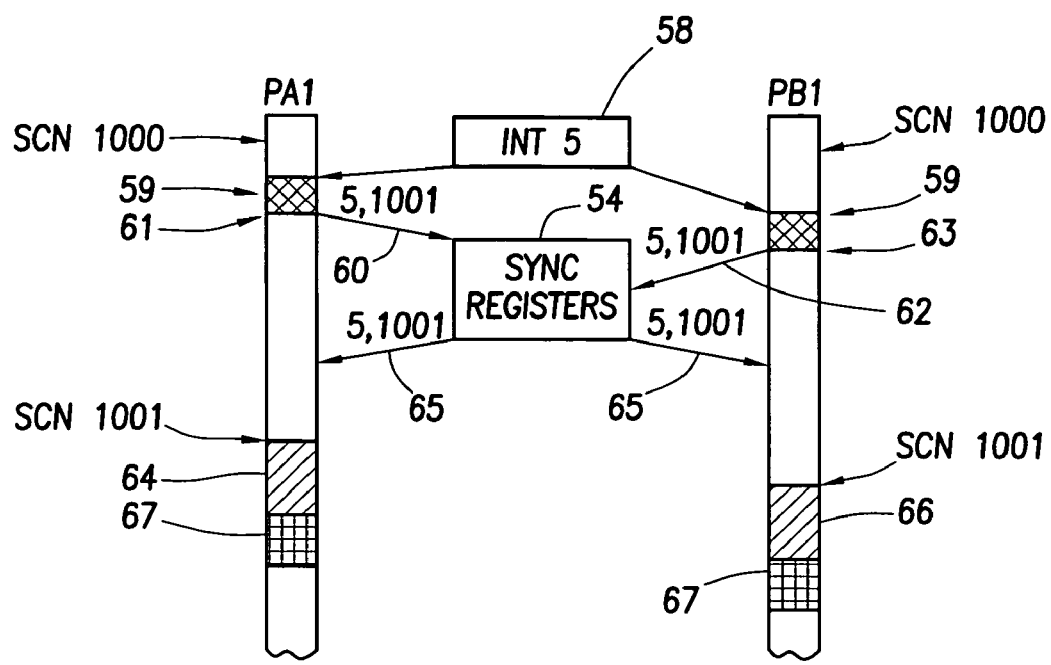
FIG. 4A illustrates an exemplary timeline in accordance with at least some embodiments of the invention.

FIG. 4A shows an illustrative timeline (with time increasing down the page) of a set of events in accordance with embodiments of the invention. The vertical bars underneath the references PA1 and PB1 represent, respectively, execution by those processors of programs. The blocks between the vertical lines represent hardware and/or events, and the lines between the central blocks and the vertical bars represent interaction of the various components as a function of time. Referring simultaneously to FIGS. 3 and 4A, assume that each processor receives an interrupt (as indicated by block 58 and the arrows pointing to each of the vertical bars). As illustrated, the interrupt is asserted to each processor at different times. When the interrupt is received, the user program is suspended and interrupt handler routine is executed (as exemplified by cross-hatched area 59). The interrupt handler routine determines the nature of the interrupt, and writes information regarding the interrupt along with a proposed system call number at which to service the interrupt to the synchronization registers. The write of the interrupt information and proposed system call number is illustrated by line 60 exemplifying that processor PA1 received an interrupt 5, and that this processor proposes that the interrupt be serviced at system call number 1001. Likewise with respect to processor PB1, though the interrupt may be asserted at a slightly different time in the user program, an interrupt handler routine is executed soon thereafter (cross-hatched area 59), and the interrupt handler routine writes an indication to the synchronization registers 54 that an interrupt has been received and a proposed system call number at which to service the interrupt, as indicated by line 62. As soon as the interrupt handler routine completes its write to the synchronization registers, the user program continues execution (beginning at points 61 and 63).

Once all the processors within a logical processor have written their respective data to the synchronization registers 54, the voter logic 56 writes at least a portion of the information in the synchronization registers 54 to the corresponding registers 57 in the memory partition of each processor in the logical processor. In accordance with at least some embodiments of the invention, information from all processors is written back to each individual processor along with time of day information.

The system call number at which to service an interrupt is, in some embodiments, the highest system call number proposed by any of the processors within the logical processor. When each individual processor reaches the designated system call number (e.g., makes a time of day call whose system call number is the highest proposed system call number), the system call program of each individual processor places an interrupt service routine in its respective dispatch queue for execution, in addition to performing its designated task. Thus, processor PA1 executes the service routine for interrupt 5 (as indicated by shaded area 67) just after the execution of the previously determined system call number (in this case SCN 1001; indicated by shaded area 64 in the PA1 time line). Alternatively, the service routine may be performed immediately before the system call. At some time thereafter, the lagging processor PB1 reaches the previously determined system call number (SCN 1001), executes the system call (shaded area 66), and executes the interrupt service routine for the exemplary interrupt 5 (shaded area 67 in the PB1 time line). Thus, though both processors do not receive the interrupt at the same time, and the processors are only loosely lock-stepped, interrupts are serviced at the same point in the user program. Note that, as illustrated in FIG. 4A, normal processing within each processor continues after the receipt of the interrupt and execution of the interrupt handler routine until the arrival at the system call number at which to execute the interrupt service routine. Note also that in the illustrative case of FIG. 4A the processors are minimally divergent in terms of their execution point of the user program, and thus in the illustrated method neither processor is stalled or slowed. The series of events illustrated in FIG. 4 is a simple case, and is presented to orient the reader to the nature of the interrupt handling in accordance with embodiments of the invention.

Figure 4B:
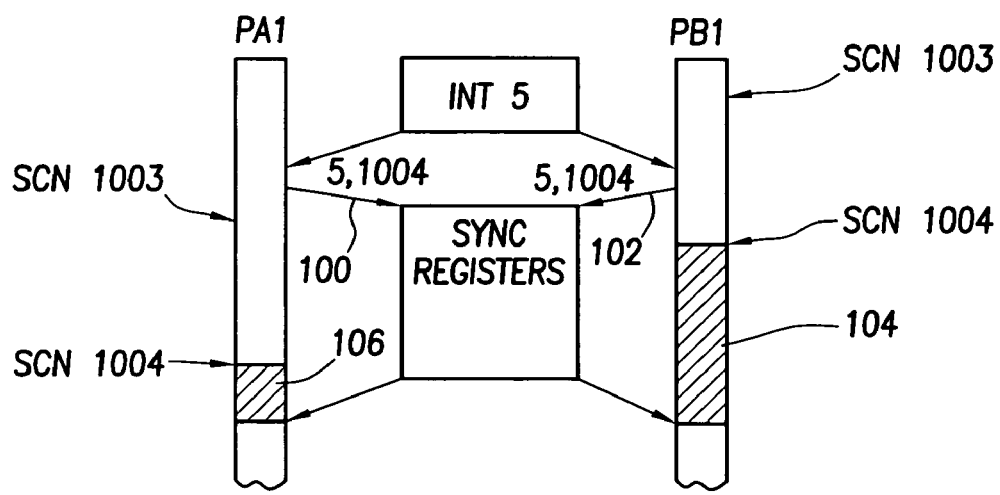
FIG. 4B illustrates a timeline in accordance with embodiments of the invention.

FIG. 4B illustrates a situation that may be encountered where one processor of a logical processor sees an interrupt before another, they agree at which system call number the interrupt should be serviced, but the confirmation of that service arrives after the processors reach the desired system call number. In particular, processor PA1 performs system call number 1003 just prior to assertion of the interrupt, whereas processor PB1 performs system call number 1003 well before the assertion of the interrupt. Both processors propose that the exemplary interrupt 5 be serviced at system call number 1004, as indicated by lines 100 and 102. In this exemplary case, however, processor PB1 reaches system call number 1004 prior to writing of the synchronization data back to the processors by the voter logic 56. In this case, processor PB1 waits in a software loop, as indicated by shaded area 104, until data is written back that confirms that the interrupt will be serviced at system call number 1004. Likewise, prior to writing by the voter logic, processor PA1 reaches system call number 1004, and likewise processor PA1 waits in a software loop, as indicated by the shaded area 106. When the voter logic associated with the exemplary two processors writes the gathered information back to the memory partition of each of the processors, and the system call programs confirm that system call number 1004 is where the interrupt should be serviced, both processors service the interrupt and continue normal processing. Note how the two processors, while initially somewhat divergent in terms of their execution point, become at least partially synchronized upon the writing of the synchronization registers from the voter logic and subsequent servicing of the interrupt.

At least partial synchronization of processors, and coordinated servicing of interrupts, and allowing the computer system to execute higher priority programs may be accomplished at rendezvous points in accordance with embodiments of the invention. However, there are user programs that when compiled to an executable form substantially as written do not make system calls for extended periods of time. Therefore, it is possible that processors within a logical processor may significantly diverge with respect to the portion of a user program that they are executing, and further may not have ample opportunity to service interrupts.

The various embodiments of the invention address, at least to some extent, the problem of a user program making infrequent system calls by a compiler-based method that inserts one or more synchronization or special instructions in the compiled version of the user program. The special instructions are not needed to implement the underlying functionality of the user program, but the special instructions give duplicate copies of a user program executing in lock-step on different processors an opportunity to service interrupts and/or at least partially synchronize their execution as discussed above. In at least some embodiments, and within a particular compiled routine, the special instructions may be inserted into the compiled routine at substantially periodic locations (e.g., at substantially every 100 instructions). However, routines may be compiled at different times or possibly one at a time, and thus the compiler may not know how many instructions will have been executed prior to entry of the routine. Embodiments for placement of the special instructions, as well as an illustrative instruction used in at least some embodiments, are discussed in turn.

Figure 5:
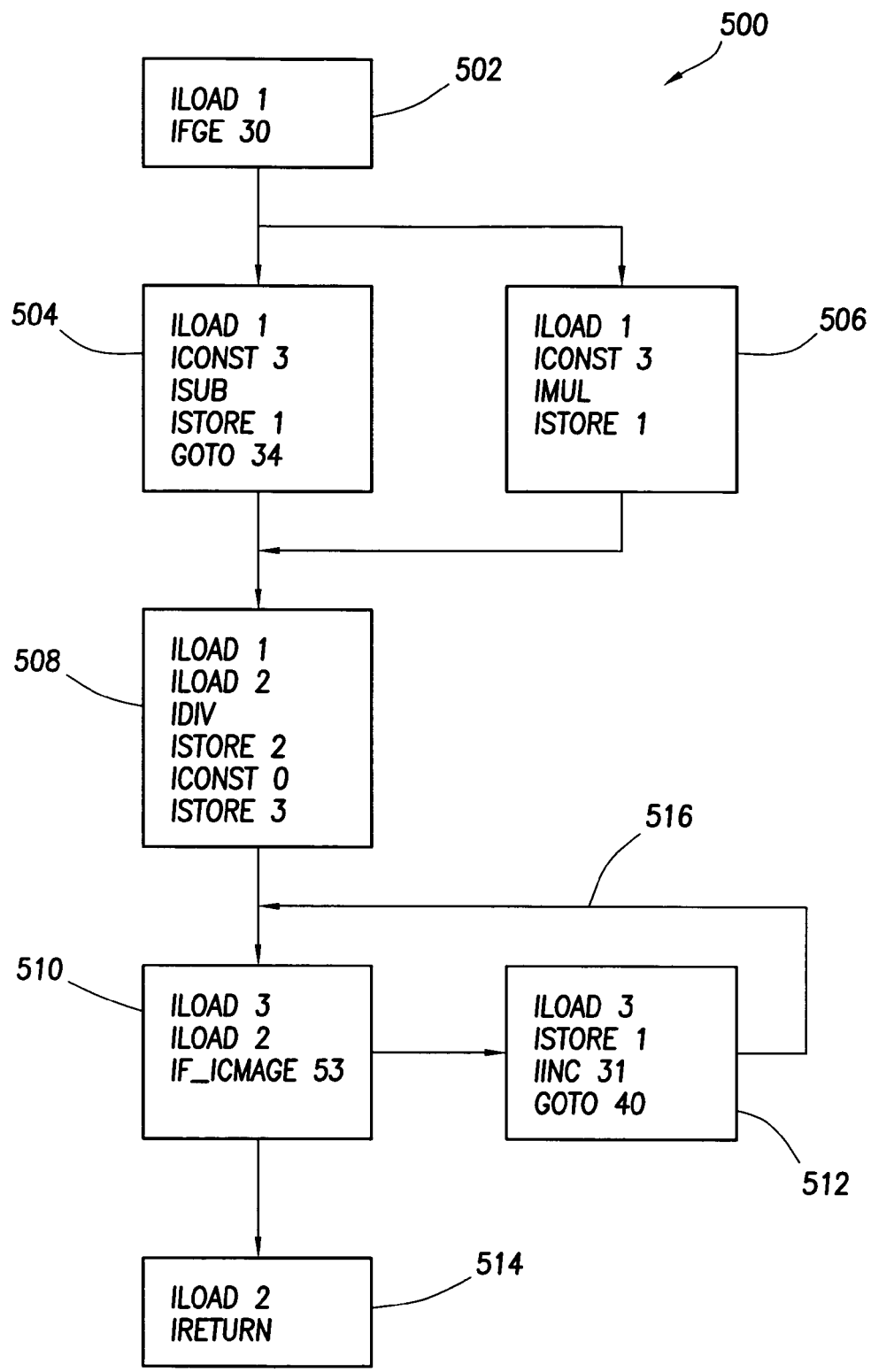
FIG. 5 illustrates a control flow graph.

Placement of the special instruction within a routine, and in accordance with at least some embodiments, involves use of a control flow graph. Part of the process of a compiler taking a first representation of a user program (e.g., source code) and converting it to a second representation (e.g., executable code) is the creation by the compiler of a control flow graph. A control flow graph is a data structure used internally by compilers to abstractly represent a routine of a program. Each node in a control flow graph represents a basic block which is a straight-line or linearly executed piece of code, thus having no jumps or jump targets. FIG. 5 shows an illustrative partial control flow graph 500 of a routine to aid in understanding placement of special instructions within routines. The control flow graph of FIG. 5 is based on Java language bytecodes, but the various embodiments are not limited to use only with Java language bytecodes. In particular, the control flow graph 500 of FIG. 5 illustrates a routine with seven total nodes, labeled 502, 504, 506, 508, 510, 512 and 514. In some embodiments, insertion of the special instruction may take place one each in each node. In alternative embodiments, placement of the special instructions may be more strategic.

Although a compiler may not know the number of instructions that will have been executed upon entry to a routine such as illustrated in FIG. 5, the compiler can, and preferably does, keep track of the number of instructions within the routine. In accordance with embodiments of the invention, the compiler counts the number of instructions within a node (taking into account instruction count from a previous node and/or the assumed value from the calling routine), and inserts a special instruction every predetermined number of instructions (e.g., 100). Thus, for example, if it is assumed that upon entry to node 508 there have been 60 instructions since the last special instruction, proximate to the $40^{th}$ instruction of node 508 a special instruction is inserted, and the instruction count reset to zero. By contrast, with an instruction count of 60 upon entering node 508, and node having only six instructions as illustrated, then the compiler steps to the next node (in this case node 510) with an instruction count of 67 instructions. In cases where program flow enters a node from more than one possible location (e.g., node 508 preceded by either node 504 or node 506), the instruction count is assumed to the highest of the two previous nodes.

Still referring to FIG. 5, and in particular the loop that comprises nodes 510 and 512. Consider the situation where the number of instructions in the loop is less than the predetermined number. The compiler may not know at compile time how many iterations of the loop will be executed, and thus even in situations where nodes of a loop comprise less than the predetermined number of instructions, a special instruction is inserted within the loop, preferably in the node representing the head of the loop. In the illustrative case of loops with more than the predetermined number of instructions, in addition to the special instruction inserted by virtue of the loop, additional special instructions may be inserted if the instruction count within the loop exceeds the predetermined threshold.

As alluded to above, a compiler may not know the number of instructions that will have been executed since the last system call of a calling routine. In order to address this possibility, at least some embodiments of the invention assume that no greater than a particular number of instructions where executed by a calling routine. In particular, in some embodiments it is assumed that a calling routine (e.g., a routine that calls the routine illustrated in control flow graph from in FIG. 5) executed approximately but no greater than two-thirds (⅔) of the predetermined number of instructions prior to calling the routine. Thus, each time a routine is analyzed, it is assumed that there is a carry over of two-thirds of the predetermined number when counting instructions. Correspondingly, upon exit from the routine, if more than one-third (⅓) of the predetermined number of instructions have been counted since the last special instruction, a special instruction is inserted. When performed across all the routines of a program then, even as between routines compiled individually or at different times it is ensured that no more than approximately the predetermined number of instructions exists between each special instruction. Alternatively, it could be assumed that no greater than one-third of the predetermined number of instructions will have been executed by the calling routine, and that a special instruction should be inserted on each exit portion of the routine if more than two-thirds of the predetermined number of instructions has been counted since the last special instruction. Further still, other proportions may be equivalently used.

Figure 6:
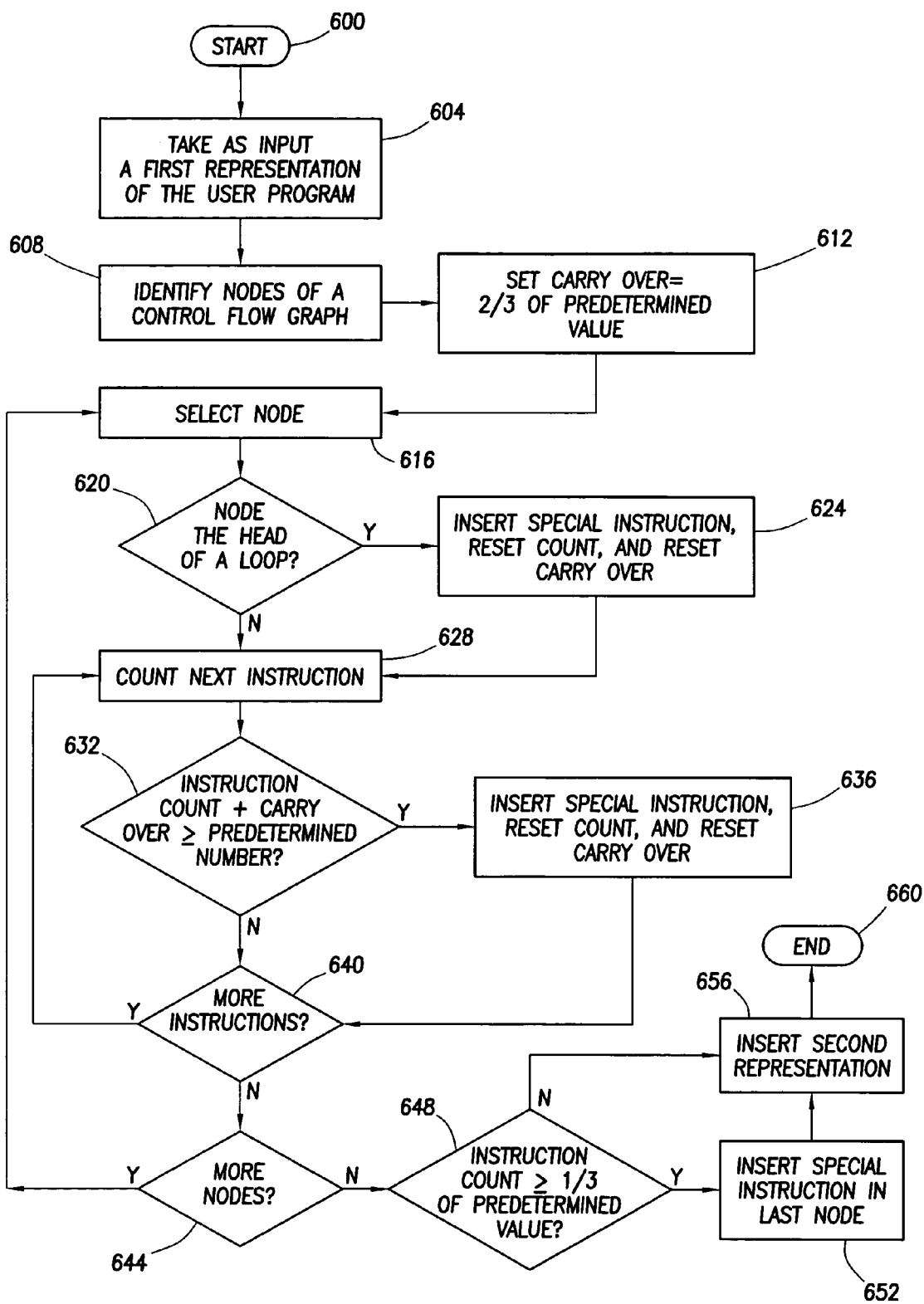
FIG. 6 illustrates a flow diagram that may be implemented in accordance with embodiments of the invention.

FIG. 6 is a flow diagram implementing the illustrative compiler-based methods of inserting special instructions within a routine. In particular, the process starts (block 600), and moves to taking as input a first representation of a user program (block 604), such as source code. From a control flow graph generated by the compiler, nodes are identified (block 608). The carry over is set, in this illustrative case, to be two-thirds of the predetermined value (block 612), and the instruction count is reset. Thereafter, a node within the routine is selected (block 616), and a determination is made as to whether the node is the head or first node of a loop (block 620). If the selected node is the head of a loop, a special instruction is inserted in the node, the instruction count is reset and the carry over count (if not previously reset) is reset (block 624). After insertion of the special instruction and resetting the various counts (block 624), or if the node is not the head of a loop (again block 620), then the next step is to count the instruction (block 628), thus increasing the instruction count. For each instruction counted, a determination is made whether the instruction count plus the carry over count (if not already reset) is greater than or equal to the predetermined value (block 632). If so, a special instruction is inserted in the node, the instruction count is reset and the carry over count (if not previously reset) is reset (block 636). Whether the special instruction is inserted (block 636) or the instruction count plus the carry over is less than the predetermined value, a determination is made whether there are more instructions in the node (block 640). If there are more instructions in the node, the illustrative process returns to counting the next instruction (block 628).

Still referring to FIG. 6, if there are no further instructions in the node, a determination is made whether there are more nodes (block 644). If there are no further nodes, then the node just analyzed is an exit node of the routine. The illustrative control flow graph of FIG. 5 shows only one exit node (node 514); however, a routine may have many exit nodes. If there are more nodes, the next node is selected (block 616), and the illustrative process continues. If there are no further nodes, and to implement the assumptions regarding the number of instructions executed upon exiting a routine, a determination is made as to whether the instruction count is greater than or equal to one-third of the predetermined number of instructions (block 648). If so, a special instruction is inserted in the last node (block 652), the second representation (e.g., executable code) is generated (block 656), and the illustrative process ends. If the instruction count is less than one-third the predetermined value (again block 648), then process jumps to generating the second representation (block 656), and thereafter ends (block 660).

In some embodiments, the special instruction itself may be, or trigger, a system call. In alternative embodiments, each special instruction may present an opportunity to make a system call, but the opportunity need not necessarily be taken. In embodiments where the compiler-based method is used to create executable code for Intel's® Itanium® processor family, the special instruction is a store instruction. In particular, these embodiments utilize the Itanium® store instruction that stores a value, and automatically increments the pointer register. Thus, the special instruction in these embodiments has the form "st1 [r13]=r0, [increment amount]" where "st1" is the store instruction, "[r13]" is the dedicated pointer register, "r0" indicates storing a zero value, and "[increment amount]" is the amount by which the pointer register (in this case r13) is incremented after the write. The store is to a dedicated memory location, and the memory area beyond the dedicated memory area is preferably unmapped. Thus, after a certain number of zero byte writes, in some embodiments 256 or 512, the register will be incremented to point to a location outside the dedicated memory area. On the next execution of the special instruction, an addressing fault is encountered, which then becomes the system call (indirectly triggered) where the various copies of the user programs can handle interrupts and/or at least partially synchronize. In these embodiments then, each system call, such as the addressing fault handler, is configured to reset the pointer register. Moreover, if a user program makes frequent system calls, the pointer register is reset each time and thus the forced system call by way of the addressing fault does not occur. Although in various embodiments the special instruction is indeed a single instruction, in alternative embodiments (e.g., embodiments that do not use an Intel processor), the "special instruction" may be a series of instruction that perform substantially the same task as the store instruction noted above.

A special instruction in accordance with embodiments of the invention is inserted approximately every predetermined number of instructions of the user code (in some embodiments 100 instructions), but the placement need not be exact. In some embodiments, actual placement of the special instruction may be shifted several instructions one way or the other such that special instruction can be placed in a location where a "no operation" (NOP) instruction would otherwise be located. Embodiments using some of Intel's® Itanium® processors may have the ability to execute three instructions at one time (the three instructions termed a "bundle"). In these embodiments, placement of the special instruction could be shifted one or more bundles in one direction or the other such that the special instruction is placed in a bundle that would otherwise contain a NOP, and where there are not already two stores issued in the same cycle. Alternatively, the special instruction could be placed in a separate bundle that where, because of stops in adjacent bundles, no additional clock cycles are consumed. In yet still further embodiments, the special instruction could be placed in a bundle that would otherwise contain a NOP, but the additional store of the special instruction causes additional cycles. Finally, the special instruction could be placed in an additional bundle that costs an extra clock cycle.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. For example, the first representation of the user program provided to the compiler need not be source code, but could be an intermediate representation. Likewise, the second representation need not itself be executable, but may need further compiling to become executable. It is intended that the following claims be interpreted to embrace all such variations and modifications.

What is claimed is:

1. A method comprising:
converting a first representation of a computer program to a second representation;
inserting into the second representation a synchronization instruction at a location where execution of the synchronization instruction consumes no extra clock cycles of the processor executing the computer program, and wherein the synchronization instruction is not needed to implement functionality in the first representation, and the synchronization instruction gives duplicate copies of the computer program executed in different processors an opportunity to at least one selected from the group: service external asynchronous interrupts; and execute higher priority programs.

2. The method as defined in claim 1 further comprising wherein inserting further comprises inserting a plurality of synchronization instructions at least one each at substantially periodic locations in the second representation.

3. The method as defined in claim 1 further comprising:
identifying linearly executed portions of the computer program; and wherein inserting further comprises inserting the synchronization instruction in each linearly executed portion.

4. The method as defined in claim 1 further comprising:
identifying nodes of a control flow graph of the computer program; and wherein inserting further comprises inserting the synchronization instruction in each node.

5. The method as defined in claim 1 wherein inserting further comprises inserting the synchronization instruction in a slot that would otherwise contain a no-operation instruction.

6. The method as defined in claim 1 wherein converting further comprises converting the first representation of the computer program to the second representation being an executable representation.

7. The method as defined in claim 1 wherein converting further comprises converting the first representation being source code to the second representation.

8. The method as defined in claim 1 wherein inserting the synchronization instruction comprises inserting a store instruction to a memory location bounded on at least one side by an unmapped region of memory.

9. A computer readable media storing a compiler program that, when executed by a processor, causes the processor to:
identify relevant portions of a first representation of a computer program;
generate a second representation of the computer program; and
place into the second representation, one each at locations corresponding to the relevant portions, a synchronization instruction at a location where execution of the synchronization instruction consumes no extra clock cycles of the processor executing the computer program, the synchronization instruction is unrelated to functionality in the first representation of the computer program, and when executed the synchronization instruction gives duplicate copies of the computer program executed in lock-step in different processors an opportunity to service external asynchronous interrupts.

10. The computer-readable media as defined in claim 9 wherein when the processor identifies, the compiler program further causes the processor to identify a plurality of relevant locations each of the plurality of relevant locations having approximately a predetermined number of instructions between them.

11. The computer-readable media as defined in claim 9 wherein when the processor identifies, the compiler program further causes the processor to identify a plurality of relevant locations, each of the plurality of relevant locations having approximately 100 sequential instructions of the second representation between them.

12. The computer-readable media as defined in claim 9 wherein when the processor identifies, the compiler program further causes the processor to identify relevant portions being sequentially executed portions.

13. The computer-readable media as defined in claim 9 wherein when the processor identifies, the compiler program further causes the processor to identify relevant portions being nodes of a control flow graph of the computer program.

14. The computer-readable media as defined in claim 9 wherein when the processor places, the compiler program further causes the processor to place the synchronization instruction in a slot that would otherwise contain a no-operation instruction.

15. The computer-readable media as defined in claim 9 wherein when the processor generates, the compiler program further causes the processor to generate the second representation being an executable representation.

16. The computer-readable media as defined in claim 9 wherein when the processor generates, the compiler program further causes the processor to generate the second representation from the first representation being source code.

17. A method comprising:
a step for compiling a first representation of a computer program to make a second representation of a computer program;
a step for analyzing at least one of the first or second representation of the computer program, and identifying relevant portions; and
a step for inserting into the second representation a synchronization instruction at a location where execution of the synchronization instruction consumes no extra clock cycles of the processor executing the computer program, the synchronization instruction gives duplicate copies of the computer program executed in different processors an opportunity to at least one selected from the group: service external asynchronous interrupts;

and execute higher priority programs.

18. The method as defined in claim 17 wherein the step for analyzing and identifying further comprises identifying relevant locations having approximately a predetermined number of instructions between them.

19. The method as defined in claim 17 wherein the step for analyzing and identifying further comprises identifying relevant portions being nodes of a control flow graph of the computer program.

20. The method as defined in claim 17 wherein the step for placing further comprises placing the synchronization instruction in a slot that would otherwise contain a no-operation instruction.

21. A computer-readable storage media storing a compiler program that, when executed by a processor, causes the processor to:
   take as input a first representation of a computer program, at least a portion of the first representation devoid of instructions that give duplicate copies of the computer program executed in lock-step in different processors an opportunity to service external asynchronous interrupts;
   generate a second representation of the computer program having one or more synchronization instructions at a location where execution of the synchronization instruction consumes no extra clock cycles of the processor executing the computer program, the synchronization instruction gives duplicate copies of the computer program executed in lock-step in different processors an opportunity to service external asynchronous interrupts, the one or more synchronization instructions in at least a portion of the second representation corresponding to the portion of the first representation.

22. The computer-readable storage media as defined in claim 21 wherein when the processor generates, the compiler program further causes the processor to generate the second representation with the one or more synchronization instructions being at nodes of a control flow graph of the computer program.

23. The computer-readable storage media as defined in claim 21 wherein when the processor generates, the compiler program further causes the processor to generate the second representation with the one or more synchronization instructions in a slot that would otherwise contain a no-operation instruction.

24. The computer-readable storage media as defined in claim 21 wherein when the processor generates, the compiler program further causes the processor to generate the second representation being an executable representation.

25. A method comprising:
   converting a first representation of a computer program to a second representation, the first representation having a first portion devoid of instructions that give duplication copies of the computer program executed in lock-step in different processors an opportunity to service external asynchronous interrupts or execute higher priority programs; and
   inserting into a portion of the second representation corresponding to the first portion a synchronization instruction at a location where execution of the synchronization instruction consumes no extra clock cycles of the processor executing the computer program, the synchronization instruction gives duplicate copies of the computer program executed in different processors an opportunity to at least one selected from the group: service external asynchronous interrupts; and execute higher priority programs.

26. The method as defined in claim 25 further comprising:
   identifying nodes of a control flow graph of the first portion of the computer program; and wherein inserting further comprises inserting the synchronization instruction in each node.

27. The method as defined in claim 25 wherein inserting further comprises inserting the synchronization instruction in a slot that would otherwise contain a no-operation instruction.

28. The method as defined in claim 25 wherein converting further comprises converting the first representation of the computer program to the second representation being an executable presentation.

* * * * *